United States Patent [19]

Lee

[11] 4,356,814

[45] Nov. 2, 1982

[54] CURVILINEAR SOLAR ENERGY COLLECTOR

[76] Inventor: David Lee, 10992 Ashton, Los Angeles, Calif. 90024

[21] Appl. No.: 214,275

[22] Filed: Dec. 8, 1980

[51] Int. Cl.³ ............................................ F24J 3/02
[52] U.S. Cl. ................................ 126/440; 126/442
[58] Field of Search ............ 126/439, 438, 440, 451, 126/442; 350/175 R, 211

[56] References Cited

U.S. PATENT DOCUMENTS 1,101,001  6/1914  Killsie ................................ 126/440
4,299,201 11/1981  Tsubota .............................. 126/440

FOREIGN PATENT DOCUMENTS 53-41834  4/1978  Japan ................................. 126/440

Primary Examiner—James C. Yeung

[57] ABSTRACT

A solar energy collector comprises a plurality of curvilinear tubes arrayed to an optimal position with respect to a path of the sun. The sun's rays are focused on the tubes by appropriately curved Frensel lenses.

4 Claims, 4 Drawing Figures

CURVILINEAR SOLAR ENERGY COLLECTOR

BACKGROUND OF THE INVENTION

1. Field of Invention

This invention relates to a solar energy collector. More particularly, it relates to a device that collects a surprisingly large amount of solar energy without having to track the sun.

2. Brief Statement of the Prior Art

The depletion of fossil fuels, together with their increasing cost, has led to the exploration of alternative energy sources. The field of nuclear energy has seen much recent development, but its inherent danger and cost tend to detract from its worth. The use of solar energy has the advantage of relative safety, low capital cost and (of course) free fuel. However, using the radiated energy of the sun has some recognized disadvantages. The chief disadvantage is the relatively low energy flux. That is, while the energy emitted from the sun is collectively enormous, a relatively small amount falls on the earth per square meter. Moreover, this small amount is variable, depending on weather conditions, time of day, time of year, and latitude. It has been recognized as desirable to maximize the energy flux by, to the extent possible, negating the adverse effect of these variable conditions. Naturally, the effects of weather and night cannot be overcome except by energy storage. However, the effects of time of year, time of day, and latitude can be minimized by selective alignment of the energy absorbing device.

In general, it is desirable that the energy absorbing device (which can be assumed to be planar when compared to the distance to the sun) be normal to the sun. Further, it is desirable that lenses be used, so a relatively larger amount of energy be concentrated on a relatively smaller area.

The problem with aligning the absorbing device with the sun, of course, is the apparent movement of the sun caused by the rotation of the earth, both about its own axis and about the sun. Machinery can be built which will move the absorber to account for this apparent movement of the sun. Regretably, such machinery is expensive when compared with the low available energy flux. Further, it must eventually break down and require maintenance, while a solar energy collector is more preferably left unattended for extensive periods of time. Thus, it is preferred that at least the seasonal variation be adjusted for by a permanent positioning relative to that movement. This permanent positioning will result in acceptable decreases in efficiency from the optimum as the seasons change.

With respect to concentrating the sun's rays, a conventional optical lens is far too expensive—again because of the low energy flux. Thus, mirrors or mirrored surfaces and prismatic lenses. Prismatic lenses are commonly known as Fresnel lenses. The problem of daily variations and lenses have been addressed by U.S. Pat. No. 3915,148; U.S. Pat. No. 4,957,048; West U.S. Pat. No. 2,872,915; and combinations thereof U.S. Pat. No. 895,761.

BRIEF STATEMENT OF THE INVENTION

Due to the Earth's Rotation, the sun appears to travel a progressively different compass heading each day. This movement reaches its extremes for sunset on the Winter and Summer Solstices, December 21, and June 21, respectively. At the latitude of Los Angeles, California, for instance, the sun sets at 241° azimuth (or 29° of due West) on December 21, and at 299° azimuth on June 21. After June 21, the sun appears to precess towards its December 21 position, reaching halfway there on the Autumnal Equinox, March 21, showing an apparent direction of due West. The sun also sets at this same due West heading at the Vernal Equinox, September 21, on its "way back" to the Summer Solstice from the Winter Solstice.

Thus, if the yearly maximum of energy is desired, the collector should be aligned normal to the apparent path of the sun (due West) at the Equinox. Such an application might be suitable, for instance, for electrical generation, where the demand is present all year long. On the other hand, if the energy collector is being used for heating, the alignment (North of the Equator) should be maximized for the winter months. This alignment would depend on the typical cold months at the location of the collector. If, for instance, the cold months extend from November first to March first, the collector should be aligned so that the sun's apparent path is normal to the collector on or about December 4. This date was calculated by making the date as far from November 1, (the closest end of the season to December 21) as one-half of the time from December 21 to the other end of the season. It can be seen that this alignment will be relatively inefficient during the summer months.

It should be noted that the base of the collecting device will be tilted with respect to the ground level at all settings except for a device at the equator aligned to collect the maximum energy in the course of a year. This peculiar case is not discussed here, and it will be assumed that the collector is typical tilted. Accordingly, all devices which depend upon a shallow pan of working fluid would be incapable of this tilted orientation, and therefore, undesirable. Rather, the collector should have its working fluid contained in pipes, thereby permitting optimum (tilted) orientation during the winter months.

The problem with containing the working fluid in pipes is that the desirable focusing elements which have the effect of concentrating the sun's rays will also cause that focused area to move as the sun "travels," either daily or annually. This movement will tend to concentrate the rays elsewhere than upon the work fluid, a naturally undesirable feature.

The device of the invention provides, by using one or more curvilinear working fluid conduits and Fresnel lenses, a structure that will both efficiently concentrate the sun's energy collecting capability at all desired times of the year and latitudes.

DESCRIPTION OF THE PREFERRED EMBODIMENTS

Figure 1:
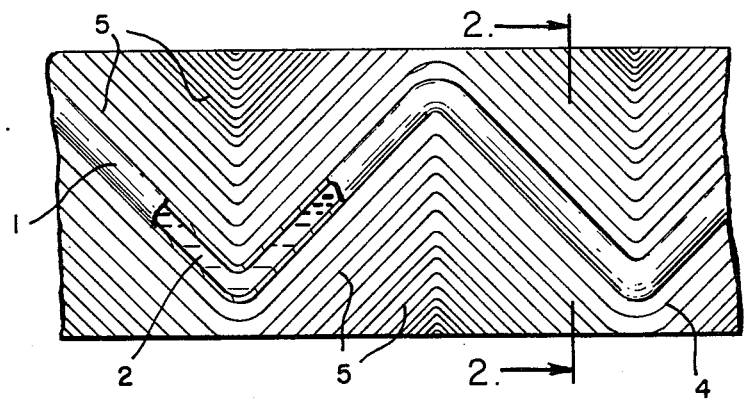
FIG. 1 is a "sun's-eye" view of a device of the instant invention.

Referring to FIG. 1, there is depicted there a working fluid, for instance, water, in its interior. The conduit is disposed in a curvilinear fashion so as to make adjacent sections at about 45° to each other. This orientation will optimize the sun's exposure, as well as increasing the length of conduit in a given length of device. Focusing elements 5 are disposed above the conduit 1 so as to focus the sun's rays (coming from the direction of the viewer of FIG. 1) on the conduit 1.

Figure 2:
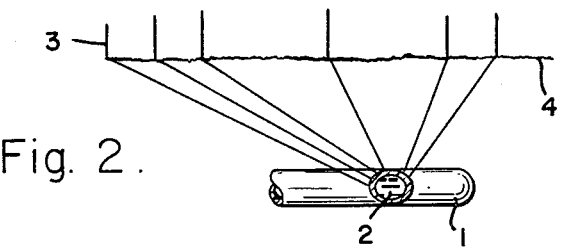
FIG. 2 is a section of the device of FIG. 1, taken along line A—A.

FIG. 2 shows a cross-section of FIG. 1, illustrating schematically sun rays 3 being focused through a transparent plane 4 containing the focusing elements 5. The rays are focused on the conduit 1, which ideally is of a heat absorbing and transmitting nature, for instance, black aluminum, thereby heating the interior 2 of the conduit 1.

Figure 3:
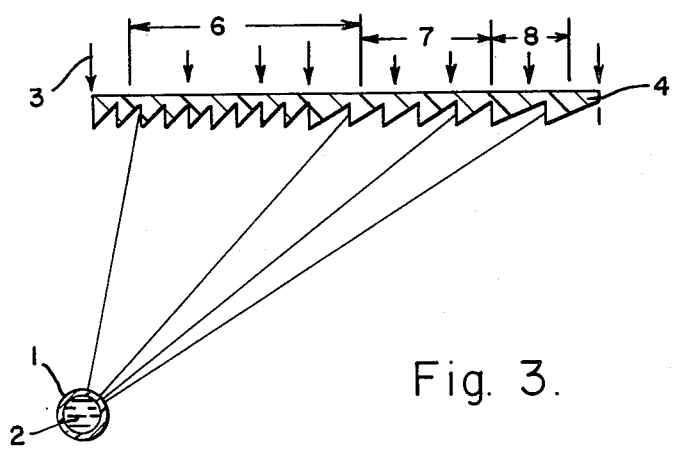
FIG. 3 is a cross-sectional enlarged view of the focusing surface 4.

FIG. 3 again shows schematic sun's rays 3 being focused on the plane 4. That plane is divided, in this illustration, into three sections 6, 7, and 8. The area 6 is a series of prismatic or Fresnel lenses of the same width and refraction. The refraction of the prisms 6 and the distance between the plane 4 and conduit 1 is such that the rays 3 passing through the Fresnel lens 6 strike the conduit 1 across most of its diameter. The Fresnel lens 7 has less of a refraction than the lens 6 inasmuch as it is closer to being directly above the conduit 1, but it too, focuses acorss the entire breadth of the conduit 1. The lens 8 refracts hardly at all inasmuch as it is even closer to being directly above the conduit 1. It must be appreciated that lenses symetrical to 6, 7, and 8, although not shown, would be a mirror image to 6, 7, and 8, and therefore, focus light on the conduit 1 from the other side. It also should be understood that six lenses (three of which are shown) are not a critical number, but are merely illustrative. The actual number of lenses will be dictated by the width of the conduit 1; the distance between the plane 4 and that conduit; and the available space. These are primarily economic considerations and do not bear upon the invention.

Figure 4:
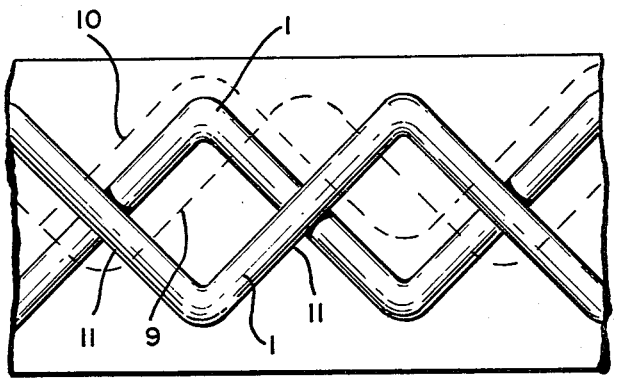
FIG. 4 is the top view of an improved version of the device of FIG. 1 with the focusing element removed.

Referring now to FIG. 4, a section similar to that of FIG. 1 is shown, but in addition to conduit 1a, conduit 11 is shown. This conduit is identical to the conduit 1, but is shifted. To illustrate this, if conduit 1 were in a sinusoidal shape (although such a shape is not critical to the invention), the conduit 1a could be considered to be a sine wave 180° out of phase with the first. The reason for this displacement is the apparent motion of the sun. To illustrate: At some point of time, the focusing elements (not shown) will focus the sun's rays directly on the conduit 1. Assuming the conduit 1 is orientated in a general east/west direction, the apparent movement of the sun will cause the focus to "travel" to the right. Thus, the dotted line 9 shows that focused portion displaced to the right of conduit 1 (assuming the sun has travelled to the left from its previously indicated position.) As the sun moves further to the left, the focus, line 9, would move further to the right. If conduit 1a were not present, it could take quite some time before the dotted line 9 (focus) again contacts and becomes congruent with conduit 1. The introduction of conduit 1a cuts that time in half and makes the device considerably more effective.

Dotted line 10 (still assuming the conduit 1 is disposed in generally an east/west direction) depicts a movement of the focus attributable to the apparent north/south displacement of the sun in the course of the year. This displacement and its disadvantages were discussed earlier in this specification. It can be seen that the additional conduit 1a provides intersections 11 with that displaced focus 10, which focus would otherwise be totally removed from the conduit 1. Thus, even when the sun is in an extremely unfavorable position due to its annual precession, there is still concentrated focusing on conduit 1a.

The use of Fresnel focusing elements is critical to this invention. The advantage of this form of lens is that the lens can be made to follow the curvilinear tube. This is complex and expensive to the point of impracticability with ordinary lenses. A method of fabricating Fresnel lenses is shown in Rice, U.S. Pat. No. 4,011,857. Particularly, the lens can be made in a thin film of a transparent flexible material, which material can then be applied to a supporting plane of, for instance, glass.

It is intended that the invention not be confined by the illustrations and preferred embodiments set forth herein. Rather, its scope is defined by the means, and their obvious equivalents, set forth in the claims below.

What is claimed is:

1. A solar energy collector comprising:
   a. A curvilinear working fluid conduit orientated normal to the mean path of the sun;
   b. A plurality of Fresnel focusing elements arrayed between the sun and the conduit, the prismatic elements of the lens being curved parallel to the conduit, whereby the sun's rays are concentrated upon the curvilinear conduit;
   c. A second curvilinear conduit substantially identical to the first disposed normal to the sun, but further along the apparent path of the sun to the extent that the extreme curves of the second conduit are disposed opposite the extreme curves of the first conduit.

2. The collector as described in claim 1, wherein said collector is fixed substantially normal to the path of the sun of the Equinox.

3. The collector as described in claim 1, wherein said collector is fixed substantially normal to the path of the sun on the two weeks between November first and November fifteenth.

4. The device of claim 1, wherein the Fresnel lenses are on a thin film supported by a transparent substrate.

* * * * *